United States Patent [19]

Pöllinger et al.

[11] 4,015,691
[45] Apr. 5, 1977

[54] DISC BRAKE FOR RAILWAY VEHICLES

[75] Inventors: Hans Pöllinger; Franz Prahl; Mathias Schörwerth, all of Munich, Germany

[73] Assignee: Knorr-Bremse GmbH, Munich, Germany

[22] Filed: Oct. 16, 1975

[21] Appl. No.: 622,958

[30] Foreign Application Priority Data

Oct. 19, 1974 Germany .......................... 2449853

[52] U.S. Cl. .................................................. 188/59
[51] Int. Cl.[2] ...................................... F16D 55/228
[58] Field of Search ............ 188/58, 59, 72.6, 72.9, 188/153 R

[56] References Cited

UNITED STATES PATENTS

| 1,079,357 | 11/1913 | Napier et al. | 188/59 |
| 2,291,016 | 7/1942 | Aurien | 188/59 |
| 3,109,517 | 11/1963 | Butler et al. | 188/59 X |

FOREIGN PATENTS OR APPLICATIONS

1,062,240   3/1967   United Kingdom ................ 188/59

Primary Examiner—Duane A. Reger
Attorney, Agent, or Firm—Edmund M. Jaskiewicz

[57] ABSTRACT

In a railway vehicle having two brake discs on the axle of a wheel and axle assembly a disc brake comprises brake shoes on opposite faces of each brake disc and the brake shoes being suspended from the bogie frame. For each brake disc there is a pair of brake levers pivotally connected by pull-rod means with the inner ends of the brake levers being pivotally connected to the brake shoes. One of the remote ends of the outer brake levers is pivotally connected to a displaceably supported brake cylinder and the remote end of the other outer brake lever is pivotally connected to a piston rod extending from the brake cylinder. The remote ends of the two central brake levers are both pivotally connected to fixed points.

12 Claims, 6 Drawing Figures

DISC BRAKE FOR RAILWAY VEHICLES

The present invention relates to disc brakes for railway vehicles, more particularly, to such disc brakes for railway vehicles having at least two brake discs on the axle of a wheel and axle assembly.

It is becoming increasingly prevalent to equip railway vehicles with disc brakes. Because of the faster operating speeds of both freight and passenger trains the braking systems are required to supply high braking outputs in order to be effective. Since the diameter of a brake disc is limited as a function of the wheel diameter of the wheels used in the trucks of the railway vehicles and since the wheel diameter is relatively small in present day rail vehicles it is apparent that there is a limit to the braking power which can be achieved from disc brakes. Relatively long passenger rail vehicles are equipped with bogies whose wheel assemblies and frames will permit only relatively small brake discs. However, it is precisely these vehicles which require high braking power. Accordingly, it has been proposed to construct disc brakes with a plurality of brake discs on each axle of a wheel and axle assembly of the trucks of such vehicles. Not only is a plurality of brake discs provided but the suspending and actuating structure for the disc brakes must also be provided on the frames.

In conventional disc brakes the brake shoes are pivotally mounted on the ends of brake levers which are pivotally interconnected by suitable lengths at substantially their midpoints to define tongs or brake lever pairs. The ends of the brake levers remote from the brake shoes are connected such that one remote end is pivotally connected to the piston rod of a pressure medium actuated brake cylinder and the other remote end connected to a fixed point which may be on the bogie frame. Where two brake discs are provided on an axle of a wheel and axle assembly it becomes necessary to provide also two brake tongs as described above. Difficulties have arisen in constructing such linkage systems which would provide a reliable connection to the brake cylinder so that both brake discs will produce effective braking power.

In one form of a disc brake wherein a single brake cylinder actuates two brake tongs, two of the ends of the brake levers remote from the brake shoes are connected to each other by means of a linkage, the third remote end is connected with the brake cylinder piston rod and the fourth remote end is pivotally connected to a fixed point on the bogie. With this multi-lever linkage system additional and supplementary mounting means on the bogie frame must be provided in order to produce the necessary actuation forces for operating the disc brakes. Because of the relatively limited space on bogie frames and particularly on frames of driving bogies, the installation of such a multi-linkage disc brake system was extremely difficult and unsatisfactory.

In the German Offenlegungsschrift 1,903,784 it was proposed to locate the brake substantially within the two brake discs. The forces to actuate the brake are exerted by the stroke of a piston rod a brake cylinder which is fixedly mounted on the bogie frame. The brake forces engage at an end of the brake tong lever disposed outwardly of one of the two brake discs and the brake tong lever disposed exteriorly at the other brake disc is pivotally suspended so as to be secured to the bogie frame. When the pull exerted by the brake piston is transmitted from one tong lever to the other because of the linkage system interconnecting the central brake tongs, the unavoidable brake lining wear increasingly causes an undesirable angular positioning of the brake tong levers. The brake tong lever pivotally connected to the brake piston rod has the highest degree of oblique positioning and the resulting shortening of the lever connected therewith may result in a failure of braking output as the associated brake shoe.

It is therefore the principal object of the present invention to provide a novel and improved disc brake for railway vehicles having at least two brake discs on an axle of a wheel and axle assembly.

It is a further object of the present invention to provide such a brake disc which will prevent excessive oblique positioning of the brake tong levers, is simple in construction and effective in operation, requires relatively simple structural elements, and which requires only a few pivot connections on the bogie frame.

The objects of the present invention are achieved by pivotally connecting the remote ends of the two outermost brake tong levers to the piston rod and to the displaceably supported housing of the brake cylinder respectively. The remote ends of the two central brake tong levers are pivotally connected to fixed points.

According to one aspect of the present invention a disc brake for a railway vehicle having two brake discs on the axle of a wheel and axle assembly may comprise a pair of brake shoes on opposite faces of each brake disc and the brake shoes are suspended from the frame of the wheel and axle assembly. A pair of brake levers are provided for each brake disc with one end of each lever being connected to a brake shoe and the other ends of the levers being remote from the brake shoes. Each pair of brake levers for a brake disc are pivotally connected by pull-rod means so as to define, in effect, a tong lever system. A brake cylinder is displaceably supported and is pivotally connected to the remote end of one of the outer brake levers. The remote end of the other of the outer brake levers is pivotally connected to a piston rod reciprocably extending from the brake cylinder. The remote ends of the two inner brake levers are each pivotally connected to fixed points.

Other objects and advantages of the present invention will be apparent upon reference to the accompanying description when taken in conjunction with the following drawings, which are exemplary, wherein:

Proceeding next to the drawings wherein like reference symbols indicate the same parts throughout the various views a specific embodiment and modifications of the present invention will be described in detail.

Figure 2:
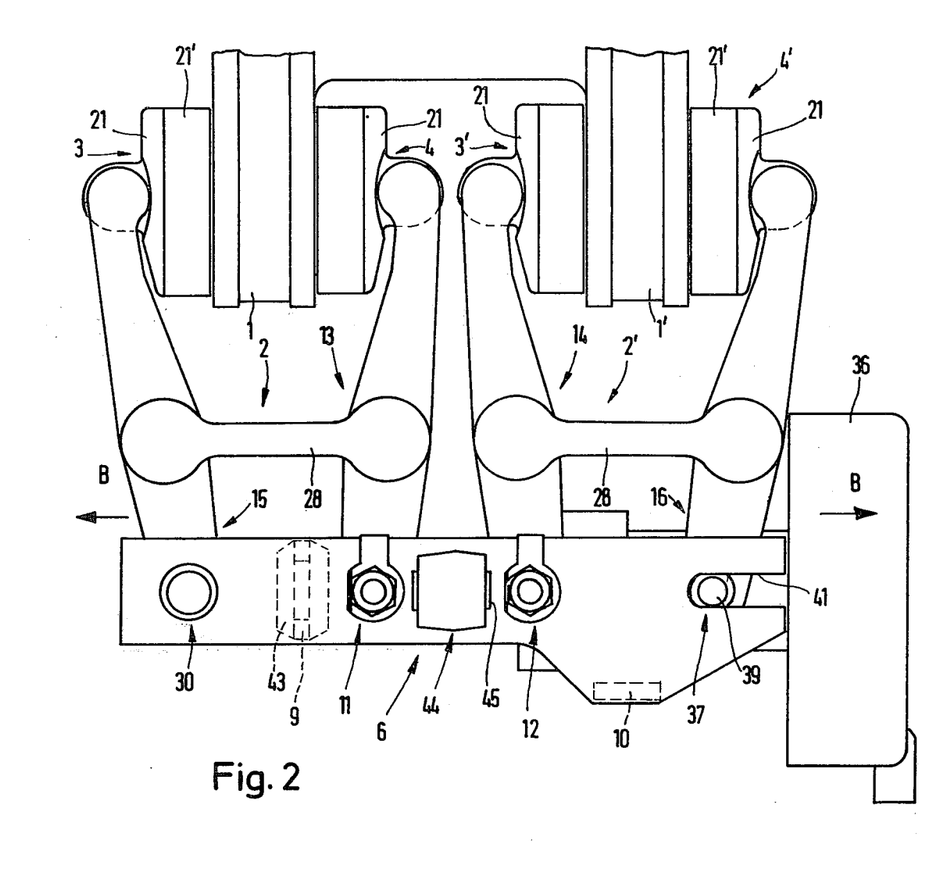
FIG. 2 is a top plan view of the disc brake for two brake discs according to the present invention.
Figure 3:
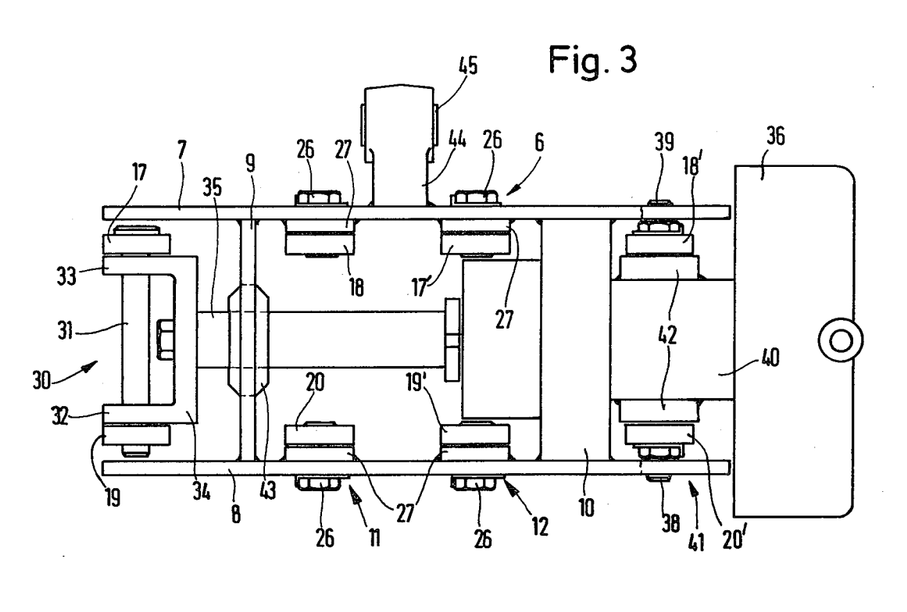
FIG. 3 is an elevational view of the disc brake shown in FIG. 2 as viewed in the longitudinal direction of the railway vehicle.
Figure 4:
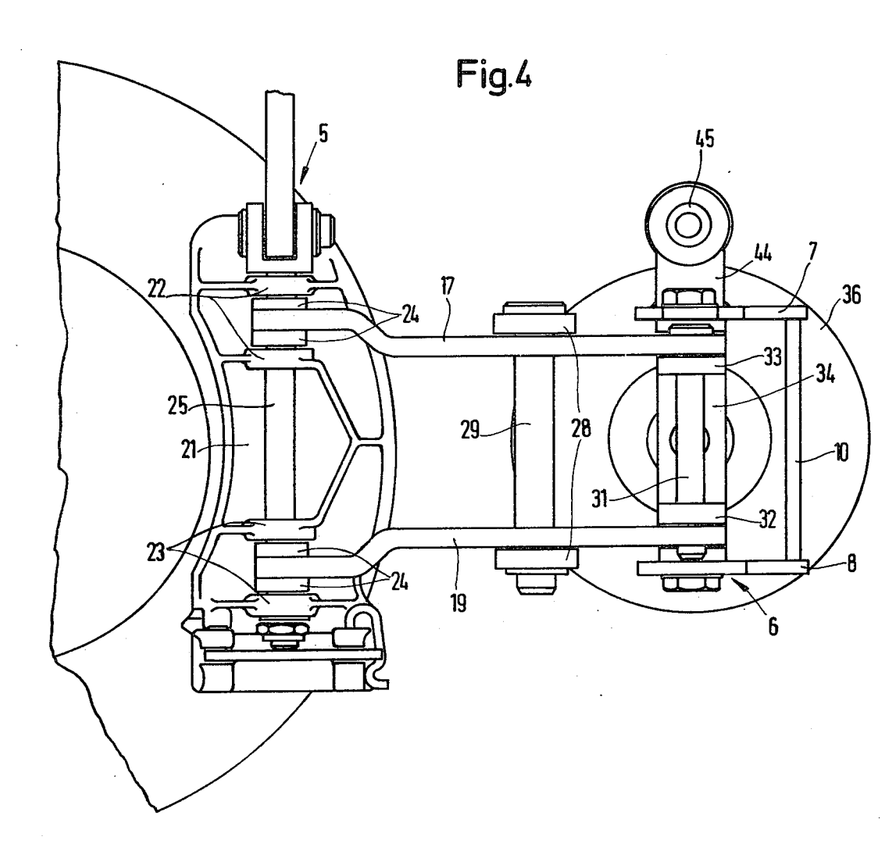
FIG. 4 is a side elevational view of the disc brake of FIG. 3 looking at the piston end of the brake cylinder.

As may be seen in FIGS. 2–4, the disc brake according to the present invention comprises two brake discs 1 and 1' which are mounted in a manner as known in the art on an axle of a wheel and axle assembly of a railway vehicle. On both sides of the brake discs 1 and 1' are positioned brake shoes 3,4 and 3', 4' which act upon the brake discs in the conventional manner. Each of the four brake shoes 3,4 and 3',4' are pivotally suspended in a known manner by means of a suspension or attachment plate 5 (FIG. 4) at the side of the bogie.

A brake lever carrier indicated generally at 6 comprises two flat horizontal carrier members 7 and 8 interconnected by flat vertically extending reinforcement elements 9 and 10 in a predetermined spaced relationship parallel to each other. The brake shoes 3 and 4 are pivotally mounted on the brake shoe ends of brake shoe levers 15 and 13 respectively which are pivotally connected at substantially their midpoints by a pull rod 28 so that the brake levers 13 and 15 form a brake tong or toggle system. In a similar manner, brake shoes 3' and 4' are pivotally mounted on the brake shoe ends of brake levers 14 and 16 respectively which are also interconnected by a pull rod 28. The ends of the two inner or central brake levers 13 and 14 are pivotally connected at 11 and 12 respectively to the brake carrier 6. The outer brake levers 15 and 16 exteriorly of the two brake discs are disposed in the same plane as the inner brake levers 13 and 14.

Each of the brake levers comprises upper and lower brake lever elements. The brake lever 15 has upper and lower brake lever elements 17 and 19, brake lever 13 has upper and lower brake lever elements 18 and 20, the brake lever 14 has upper and lower brake lever elements 17' and 19' and brake lever 16 has upper and lower brake lever elements 18' and 20'.

Each of the brake shoes has a structure as known in the art which comprises a brake lining carrier or support member 21 upon which is mounted a brake lining 21'. The brake lining carrier 21 is provided with an upper pair of spaced eyes 22 and a lower pair of spaced eyes 23 as may be seen in FIG. 4. As shown in FIG. 4, the upper and lower brake lever elements 17 and 19 of the brake lever 15 are pivotally connected to the brake lining eyes 22 and 23 using thrust bearings or washers 24 and a vertically extending pivot pin 25. In a similar manner, each of the brake levers 13, 14 and 16 are pivotally connected to their respective brake shoes.

The ends remote from the brake shoes of the brake lever elements 18, 20 and 17' 19' of the brake levers 13, 14 positioned between the brake discs are pivotally connected to one of the respective carrier members 7 and 8 by means of bolts 26 secured within eyes 27 attached to the carrier members 7 and 8 to provide for free pivotal movement with respect to the carrier member. The pull-rods 28 interconnect the upper and lower brake lever elements respectively by means of vertical pins 29.

One of the ends 30 remote from the brake shoes of the brake lever 15 is pivotally connected by a pin 31 to two parallel arms 32 and 33 of a U-shaped bracket 34 mounted on the end of a brake piston rod 35, or maybe mounted on elements thereof, extending from a pressure actuated brake cylinder 36. The remote end 37 of the other outer brake lever 16 has pins 38 and 39 attached thereto so as to be attached to two support elements 42 of a guide element 40 extending from the brake cylinder 36. The ends of the pins or studs 38 and 39 project into guideslots 41 formed in each end of the carrier members 7 and 8 at the brake cylinder ends thereof and parallel to the longitudinal axis of the brake piston rod 35. By this pin and slot arrangement, the remote ends of the brake lever 16 are connected to the brake lever carrier 6.

As shown in FIG. 3, the reinforcing interconnecting element 9 is provided with a recess in which is mounted a guide sleeve or bushing 43 which is aligned with the longitudinal axis of the brake piston rod 35 so as to slidably receive and support the piston rod. A bearing pedastal 44 having a rubber sleeve or bushing therein is fixedly mounted on the upper carrier member 7 to permit resilient suspension of the brake carrier 6 from elements of the bogie frame. This suspension structure not only dampens noises but compensates for any transverse displacements resulting from the movements of the ends of the brake levers travelling on arcs of a circle.

In the operation of the disc brake as described above it is assumed that the brake linings 21' have not been worn. The brake levers 15, 13, 14 and 16 will then be in the positions shown by the full lines in FIG. 1. Since the angle variations between the braking and release positions of the brake shoes 21' are so small these angles can be disregarded in describing the functioning of the disc brake.

Figure 1:
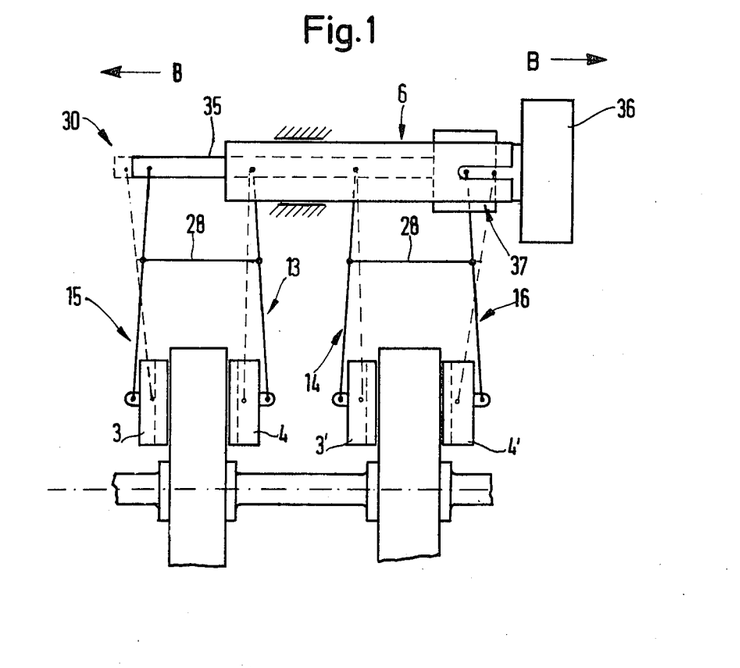
FIG. 1 is a schematic representation of the structure and operation of the disc brake according to the present invention for two brake discs.

During a braking operation, the brake piston rod 35 will be displaced toward the left as viewed in FIG. 1. This displacement of the piston rod 35 will be due either because of the pressure within the pressure medium actuated brake cylinder or, as in some constructions, because of the release of the pressure of a stressed loading spring in the brake cylinder 36.

Since the brake cylinder housing 36 is displaceably supported and is pivotably connected only with the end 37 of the brake lever 16 and since the piston rod 35 is pivotably connected only with the end 30 of the brake lever 15, the forces imposed upon these brake levers by the displacement of the piston rod 35 to the left will be uniformly transmitted to the two brake levers 15 and 16 in the directions as indicated by the arrows B at the respective brake levers. As soon as the two outer brake shoes 3 and 4' have engaged the respective brake discs, forces are transmitted by the pull rods 28 to the inner brake levers 13 and 14. Since the brake levers 13 and 14 are pivotally connected at fixed points to the brake carrier 6 the force exerted by the pull-rods 28 will cause the inner brake shoes 4 and 3' to also engage the respective brake discs.

In order to release the brakes, the brake levers are subjected to forces in the opposite directions and for release purposes the force of the return spring in the brake cylinder is generally adequate.

If the thickness of the brake lining has been substantially reduced as a result of wear produced by braking operations, the brake levers will be in the oblique positions as shown in the dashed lines in FIG. 1. As a result of the present invention, the magnitude of these angular or oblique positions of the brake levers will be within acceptable limits.

As can be seen from the above description of the structure and operation of the brake device that the points to which forces are applied and thus the application of the forces in general as related to a reference plane positioned between the brake discs perpendicular to the carrier 6 will show a mirror image relationship. Oblique positioning of the brake levers resulting from wear of the brake shoes will therefore not be cumulative from one outer side of the brake disc arrangement to the other outer side as is the case in brake devices known up to the present time. Since the two brake levers 13 and 14 positioned between the brake discs operate separately and independently from each other with respect to the applied forces, there will be no significant oblique positioning of the brake levers because of brake shoe wear as would occur in a braking device having only a single brake disc provided with a brake tong lever arrangement as described herein.

The weight of the brake cylinder 36 is supported substantially by the engagement of the guide pin 38 against both sides of guide slot 41 in carrier member 8. However, it is to be noted that the entire weight of the brake cylinder 36 is not supported at this location since a significant proportion of the weight of the brake piston rod 35 is supported in the guide sleeve 43 mounted in the reinforcing element 9.

Figure 5:
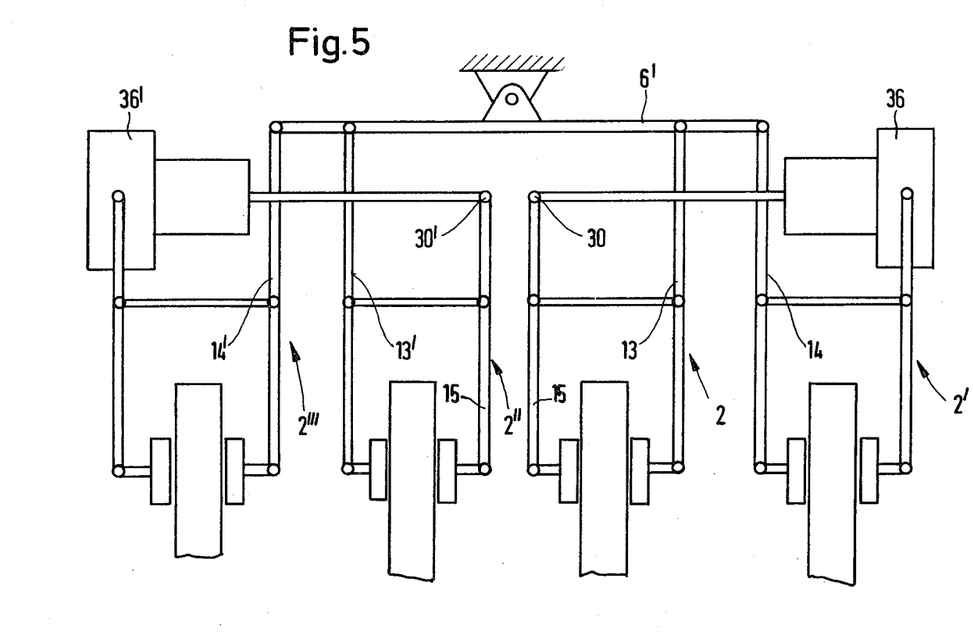
FIGS. 5 and 6 are schematic representations of two modifications of the present invention as applied to four brake discs on an axle.

The disc brake as described above can also be utilized for a wheel and axle assembly wherein the axle is provided with four brake discs. As shown diagrammatically in FIG. 5, one brake cylinder 36 will actuate the brake lever pairs 2 and 2' and the other brake cylinder 36' will actuate the brake lever pairs 2'' and 2'''. All of the brake levers 13, 14 and 13', 14' which are disposed between an outer and an adjacent central brake disc have their remote ends pivotally connected to a carrier 6' which, for purposes of clarity in the drawing, is illustrated as being laterally offset. The two brake cylinders 36 and 36' are positioned opposite each other at both end faces of the brake lever carrier 6'. The construction corresponds to that described for the brake devices of FIGS. 2–4 with an appropriate extension of the brake lever carrier. The pivot connections 30 and 30' of the two central brake levers 15 and 15' are located with adequate spacing or vertically offset with respect to each other in such a manner that there will be no contact between them. The vertial offset may be simply achieved by varying the spacing of the two individual brake levers 15 and 15'.

Figure 6:
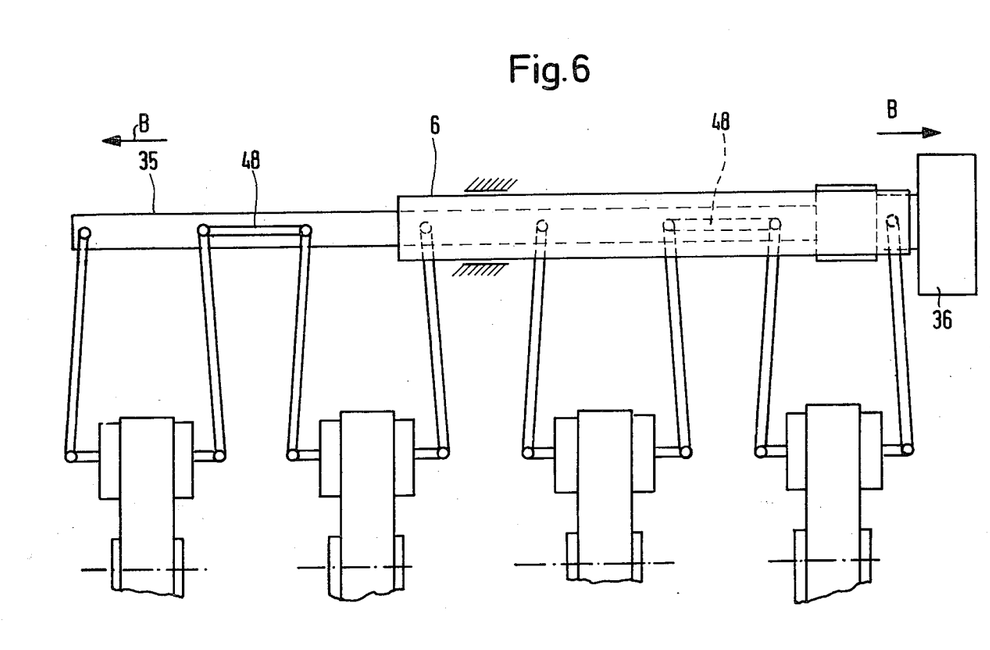

In FIG. 6, there is a further modification wherein a brake device comprising four brake discs on the axle is actuated with only a single brake cylinder 36. One of the outer brake levers has its remote end pivotally connected to the brake cylinder housing and the other outer brake lever is pivotally connected to the end of the piston rod 35. The remote ends of the two central brake levers are both pivotally connected to fixed points on the carrier 6. The inner brake levers between an outer brake disc and a central brake disc are pivotally connected to each other by linkage comprising pull-rods 48. In this construction, wear of the brake shoes will bring about an oblique positioning of the brake levers which corresponds to that of the prior art structures as discussed above, however, it is to be noted that in this modification four pairs of brake levers are actuated by one brake cylinder instead of the two pairs of brake levers as disclosed in the prior art structures.

Thus it can be seen that the present invention discloses a simple and effective brake device for rail vehicles having at least two brake discs on an axle of a wheel and axle assembly wherein the brake shoes are suspended by linkage from the bogie frame. The ends of the brake levers remote from the brake shoes are pivotally connected to the piston rod or to the brake cylinder housing of a pressure medium actuated brake cylinder and the remote ends of the inner brake levers are pivotally connected to fixed points on the bogie frame.

It will be understood that this invention is susceptible to modification in order to adapt it to different usages and conditions, and accordingly, it is desired to comprehend such modifications within this invention as may fall within the scope of appended claims.

What is claimed is:

1. A disc brake for a railway vehicle having two brake discs on the axle of a wheel and axle assembly, comprising a pair of brake shoes on opposite faces of each brake disc, means suspending said brake shoes from the frame of the wheel and axle assembly, a pair of brake levers for each brake disc, said brake levers each having one end thereof connected to a said brake shoe and the other ends of said brake levers being remote from said brake shoes, pull-rod means for pivotally connecting each pair of brake levers between the ends thereof, said brake levers defining two outer levers and two inner levers disposed between said outer levers, a displaceably supported brake cylinder having a reciprocable piston rod extending therefrom and said cylinder pivotally connected to the remote end of one of said outer brake levers, the remote end of the other of the outer brake levers being pivotally connected to said piston rod, and means for defining a pair of fixed points, said fixed point means comprising a carrier and the remote ends of said two inner brake levers being pivotally connected to said fixed points on said carrier.

2. A disc brake as claimed in claim 1 and means on said carrier for guiding said piston rod and brake cylinder parallel to the axis of the wheel and axle assembly.

3. A disc brake as claimed in claim 2 wherein said brake cylinder has a housing and a guide element thereon surrounding said piston rod, said guide element being pivotally connected to the remote end of said one of said outer brake levers, and means on said carrier for defining a cantilever support of said brake cylinder housing laterally of said brake levers.

4. A disc brake as claimed in claim 3 wherein said carrier comprises spaced upper and lower carrier members and a pair of vertical elements rigidly interconnecting said upper and lower carrier members in predetermined spaced relationship, said brake levers each comprising spaced upper and lower brake lever elements, a first pin pivotally connecting the brake shoe ends of said brake lever elements to each of said brake shoes, a second pin pivotally connecting the remote ends of each of the inner brake lever elements to one of said upper and lower carrier members, each of said pairs of upper and lower brake lever elements of said outer brake lever being pivotally respectively connected to one of said piston rod and said brake cylinder guide element.

5. A disc brake as claimed in claim 4 and a pair of third pins pivotally connecting said pair of brake lever elements of one of said outer brake levers to said brake cylinder guide element, said pair of third pins being on opposite sides of said guide element parallel to the longitudinal axes of said brake shoe vertical pins and intersecting the longitudinal axis of said piston rod.

6. A disc brake as claimed in claim 5 and a U-shaped bracket on the free end of said piston rod and having a pair of parallel arms receiving a fourth pin therethrough pivotally connecting said pair of brake lever elements of the other of said outer levers, the axis of said fourth pin being parallel to the longitudinal axes of said brake shoe first pins.

7. A disc brake as claimed in claim 5 wherein there are guide slots in the ends of said upper and lower carrier members adjacent said brake cylinder parallel to the axis of said piston rod slidably receiving said third pins therein.

8. A disc brake as claimed in claim 4 wherein one of said vertical interconnecting elements has a guide sleeve thereon slidably supporting said piston rod therein.

9. A disc brake as claimed in claim 1 wherein said pull-rod means comprises a pull-rod for each pair of the upper and lower brake lever elements of each pair of brake levers substantially in the centers of said brake levers with respect to the ends thereof, and a fifth pin pivotally interconnecting the ends of said pull-rod between the brake lever elements of each brake lever.

10. A disc brake as claimed in claim 2 and a bearing block having an eye therethrough rigidly secured to the upper portion of said carrier to suspend resiliently said carrier.

11. A disc brake as claimed in claim 1 wherein there are four brake discs on the axle of a wheel and axle assembly to define two outer brake discs and two central brake discs therebetween and a second brake cylinder, one of said outer brake discs and a central brake disc adjacent thereto being operatively connected to each of said brake cylinders, a carrier member and the brake levers between each outer brake disc and the central brake disc adjacent thereto being pivotally connected thereto, said two brake cylinders being disposed opposite each other laterally of said carrier.

12. A brake disc as claimed in claim 1 wherein there are four brake discs on the axle of a wheel and axle assembly to define two outer brake discs and two central brake discs therebetween, and linkage means for connecting pivotally the remote ends of the brake levers disposed between each outer and the next adjacent central brake disc.

* * * * *